(12) United States Patent
Sollman

(10) Patent No.: US 8,883,301 B2
(45) Date of Patent: Nov. 11, 2014

(54) COEXTRUSION FILM AND METHOD OF MAKING A LAMINATED WEB

(75) Inventor: Henner Sollman, Gronau (DE)

(73) Assignee: Mondi Gronau GmbH, Gronau (DE)

( * ) Notice: Subject to any disclaimer, the term of this patent is extended or adjusted under 35 U.S.C. 154(b) by 0 days.

(21) Appl. No.: 12/907,268

(22) Filed: Oct. 19, 2010

(65) Prior Publication Data

US 2011/0262741 A1    Oct. 27, 2011

(30) Foreign Application Priority Data

Oct. 20, 2009    (EP) .................................... 09013199

(51) Int. Cl.
| | | |
|---|---|---|
| B32B 27/36 | (2006.01) |
| B32B 27/00 | (2006.01) |
| B32B 27/06 | (2006.01) |
| B32B 27/08 | (2006.01) |
| B32B 27/32 | (2006.01) |
| B29C 47/00 | (2006.01) |
| G11B 5/64 | (2006.01) |
| B32B 25/08 | (2006.01) |
| B32B 25/14 | (2006.01) |
| B32B 27/28 | (2006.01) |
| B32B 7/06 | (2006.01) |
| B32B 27/34 | (2006.01) |

(52) U.S. Cl.
CPC . *B32B 7/06* (2013.01); *B32B 25/08* (2013.01); *B32B 27/32* (2013.01); *B32B 27/08* (2013.01); *B32B 25/14* (2013.01); *B32B 27/28* (2013.01); *B32B 27/34* (2013.01); *B32B 27/06* (2013.01); *B32B 27/36* (2013.01)
USPC ........ 428/336; 428/412; 428/476.9; 428/483; 428/519; 428/521; 156/244.11; 156/244.23

(58) Field of Classification Search
None
See application file for complete search history.

(56) References Cited

U.S. PATENT DOCUMENTS

| | | | |
|---|---|---|---|
| 7,449,240 B2 | 11/2008 | Hamulski | |
| 7,470,340 B2 | 12/2008 | Baldauf | |
| 7,601,658 B2 * | 10/2009 | Hagemann et al. ........... | 442/328 |
| 2006/0225835 A1 | 10/2006 | Schonbeck | |
| 2010/0062221 A1 * | 3/2010 | Hoenigmann et al. ........ | 428/156 |

* cited by examiner

*Primary Examiner* — Sheeba Ahmed
(74) *Attorney, Agent, or Firm* — Andrew Wilford

(57) ABSTRACT

A coextrusion film according to a first embodiment of the invention has a monolithic elastic layer of a thermoplastic elastomer having an exposed outer face and an inner face and a support layer lying on, releasably joined to, and separable from the inner face at an interface.

17 Claims, 3 Drawing Sheets

COEXTRUSION FILM AND METHOD OF MAKING A LAMINATED WEB

FIELD OF THE INVENTION

The present invention relates to a plastic film. More particularly this invention concerns a coextruded film having at least two layers and to a method of making same.

BACKGROUND OF THE INVENTION

The invention relates to a coextrusion film that has a layer of thermoplastic elastomer. Such a coextrusion film is provided for the production of composite elements, where in particular lamination with a stretchable but typically inelastic nonwoven material is intended. Such a laminated composite web can, for example, be provided as elastic tape or as elastic band of disposable hygienic products such as, for example, baby diapers or comparable incontinence articles. The elasticity of the laminated composite is thus achieved by a layer of thermoplastic elastomer.

In the production of a monocomponent film consisting of thermoplastic elastomer there exists the problem that traction applied to the film during handling must be kept low to ensure that intense stretching or tearing is avoided. Thermoplastic elastomers further have significant inherent adhesiveness and can quickly bond together after being rolled up on a roll, so that storage of monocomponent film consisting of thermoplastic elastomer is not possible in roll form.

A coextrusion film is known from U.S. Pat. No. 7,449,240 that has a core layer of a thermoplastic elastomer and at least one skin layer. When the coextrusion film is rolled up, the skin layer acts as a separator and thus prevents the stick core layers of adjacent turns from coming into direct contact with each other, so that bonding-together can be avoided. Although the known coextrusion film has proven itself in practice, there exists the disadvantage that first an embrittlement of the skin layer and subsequently in an additional method step of activation of the coextrusion film due to an overexpansion is required, in which the at least one stiff outer layer tears open in strips in the direction of expansion. Perpendicular to this direction of expansion, the coextrusion film remains stiff.

Laminating a monocomponent film of a sticky thermoplastic elastomer with a thin nonblocking layer of nonwoven immediately after extrusion is known from U.S. Pat. No. 7,470,340. On the one hand this process protects the elastic monocomponent film from excessive expansion during handling, and on the other hand prevents bonding together when rolled up. As immediately after extrusion of the monocomponent film, a nonwoven material must be fed in and laminated, the method is laborious. Further, the applications of the formed laminated composite are limited as a preliminary product due to the outer layer of nonwoven provided on the at least one side.

In order to avoid bonding together of sticky monocomponent films made of thermoplastic elastomers, it is further known to cover them with a powder after extrusion. According to US 2006/0225835, a powder made of polymeric material is used that melts during lamination of the elastic monocomponent film with a covering material by a hot-melt adhesive, as a result of which the stability of the composite that is to be achieved is not significantly impaired by the powder. The described method requires that the elastic monocomponent film be combined with a covering material by hot-melt adhesive, the bonding temperature of the hot-melt adhesive on the one hand, and the melting temperature of the powder on the other hand, forcibly being coordinated with each other. Further, although the powder prevents bonding together of the monocomponent films consisting of thermoplastic monomer during storage in rolls, when handling the monocomponent film, the tensions must be kept low in order to avoid uncontrolled stretching or tearing.

OBJECT OF THE INVENTION

It is therefore an object of the present invention to provide an improved coextruded film having an elastic layer that can be rolled up on a roll and stored, is easy to handle and has many applications.

SUMMARY OF THE INVENTION

A coextrusion film according to a first embodiment of the invention has a monolithic elastic layer of a thermoplastic elastomer having an exposed outer face and an inner face and a support layer lying on, releasably joined to, and separable from the inner face at an interface. Thus the coextrusion film can be separated at the interface into a one-layer elastic film consisting of thermoplastic elastomer and a support film. In accordance with the invention, the layer of thermoplastic elastomer is stabilized directly after discharge from the extrusion nozzle by an adjacent one-layer or multilayer support film. Without additional treatment or coating, the coextrusion film that is formed can be rolled up so the support film prevents bonding together in the roll. Simultaneously, the coextrusion film has a high tensile strength, so that excessive stretching or tearing can be avoided even upon exposure to heightened tensions. In order to be able to use the single layer elastic film made of thermoplastic elastomer, for example, as elastic layer of a composite element, it can be separated from the support film at the inner-layer interface.

The release characteristics that have been described can be achieved by polarity differences between the elastic film on one hand, and the release layer of the support film on the other hand. While according to a preferred embodiment the release layer consists of a inelastic polar polymer, the thermoplastic elastomer is nonpolar or has only a very low polarity. Thus, the elastic film can, for example, consist of a styrene block copolymer, in particular, styrene-butadiene-styrene copolymer (SBS), styrene-isoprene-styrene block copolymer (SIS), styrene ethane butylene styrene copolymer (SEBS) or mixtures of at least two of the cited styrene block copolymers. As is standard, admixtures of additives or filler substances can be provided.

According to a second embodiment, the object of the invention is attained by a coextrusion film that can be separated at an inner layer interface into an stretchable film and a support film, where the stretchable film is provided with an elastic layer consisting of thermoplastic elastomer as well as a layer of stretchable polymer.

Preferably, the layer consisting of stretchable polymer is adjacent the inner-layer interface of the coextrusion film, and even then, as described before with respect to the first embodiment, the release characteristics can be achieved by different polarities between the layers made of stretchable polymer for one, and the adjacent release layer for another. In particular, the layer consisting of stretchable polymer can be formed by a polyolefin such as polyethylene that is completely nonpolar. The additional layer of stretchable polymer is provided for the purpose of stabilizing the elastic layer of thermoplastic elastomer to a certain degree, after separation from the release layer. Since after the separation of the support film, a slight elasticity is aimed for, and after stretching the elastic resetting of the layer made of thermoplastic elastomer is not intended to be significantly influenced by the additional stretchable layer, the layer of stretchable polymer causes only a slight stabilization that counteracts a strong expansion when subjected to low tensions. For this reason, the stretchable layer preferably has only a moderate thickness of less than 20 μm, especially less than 10 μm.

Within the scope of the first and second embodiments of the invention, separation of the support film is preferably achieved by selecting different polarities at the interface of layers of the adjacent layers. The release layer is intended to have sufficient stability to ensure problem-free handling of the coextrusion film and in order to be able to strip the support film from the elastic film without any tearing. On the other hand, the support film must not be too stiff. In addition, a total material requirement that is as low as possible is aimed for, in particular, as the stripped support film must usually be disposed without having any further use, or must be recycled. The thickness of the release layer is therefore preferably between 2 μm and 100 μm. When determining a suitable thickness it must also be taken into consideration whether the support film is formed in one layer consisting only of the release layer, or whether it has at least one additional layer.

In accordance with the invention, the coextrusion film can be separated into a support film on the one hand and a single-layer elastic film or a stretchable film with a layer of strippable thermoplastic elastomer on the other. The release characteristics are thereby selected such that the two films that are formed do not tear in the separation process and can also be handled when separated from each other. The composite adhesion specified according to DIN 53 357-A is customarily between 0.005 N/25 mm and 4 N/25 mm. The peeling value that is described is selected in such a way that on the one hand, when handling the coextrusion film, the support film and the elastic film or stretchable film adhere to each other at least slightly and on the other hand, the support film can be pulled off easily.

For many applications, in particular an excessive stretching of the elastic or stretchable film is to be avoided during the stripping process because of the increased tensions. The preferred range for the peeling value is between 0.01 N/25 mm and 1 N/25 mm.

In order to make the provided separation of the coextrusion film in accordance with the invention possible, the release layer is formed by a inelastic polar polymer. Suitable are, for example, polyamides (PA) with their strongly polar amide group, polymethyl methacrylate (PMMA), polyoxymethylene (POM) as well as ester thermoplastics, such as polycarbonate (PC), polyethylene terephthalate (PET) and polybutylene terephthalate (PBT). Further, at least two of the cited polymers and/or different types of the cited polymers can also be provided as a mixture.

When the support films consist exclusively of the release layer, it preferably is thicker in order to ensure sufficient stability of the elastic film or the stretchable film. On the other hand, when the support film is formed of multiple layers, a functional division can be achieved with an additional support layer contributing at least significantly to the support and stiffening of the coextrusion film. The release layer can then be designed correspondingly thinner, and preferably have a thickness of less than 20 μm, preferably less than 10 μm. Thermoplastic polymers with high polarity are usually comparably expensive, so that by means of the described division of functions, a cost reduction can be achieved. Thus the support is layer can have an inexpensive polyolefin as basic substance, and it can be connected with a release layer by a thin adhesive intermediate layer.

The subject matter of the invention is also a method for making a composite material, where a coextrusion film is formed having a layer of thermoplastic elastomer at a first surface and separated at an inner-layer interface into a layer comprising a film made of stretchable elastomer and a support film. Then the coextrusion film is rolled up on a roll, where it may stay for a while, for instance in storage or during transport. Subsequently the coextrusion film is pulled off the roll, and the support film is removed immediately before a nonwoven web is laminated with the film that remains after separation of the support film.

As explained before, the support film stabilizes the layer consisting of thermoplastic elastomer, so that the entire coextrusion film can be handled easily and processed further even when exposed to large tensions. Thus, the coextrusion film can, for example, be cut into strips prior to separating the support film, whereby the strips that remain of the film after the support film is pulled off are laminated at a distance from each other in horizontal direction between two, inelastic two-dimensional nonwoven panels, so that sections in the horizontal direction that are provided with an elastic reset after an expansion, alternate with inelastic sections.

As the layer consisting of thermoplastic elastomer is stabilized by the support film immediately after extrusion, the layer made of thermoplastic elastomer can also have a reduced thickness in contrast to known embodiments, as a result of which an overall cost advantage results.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
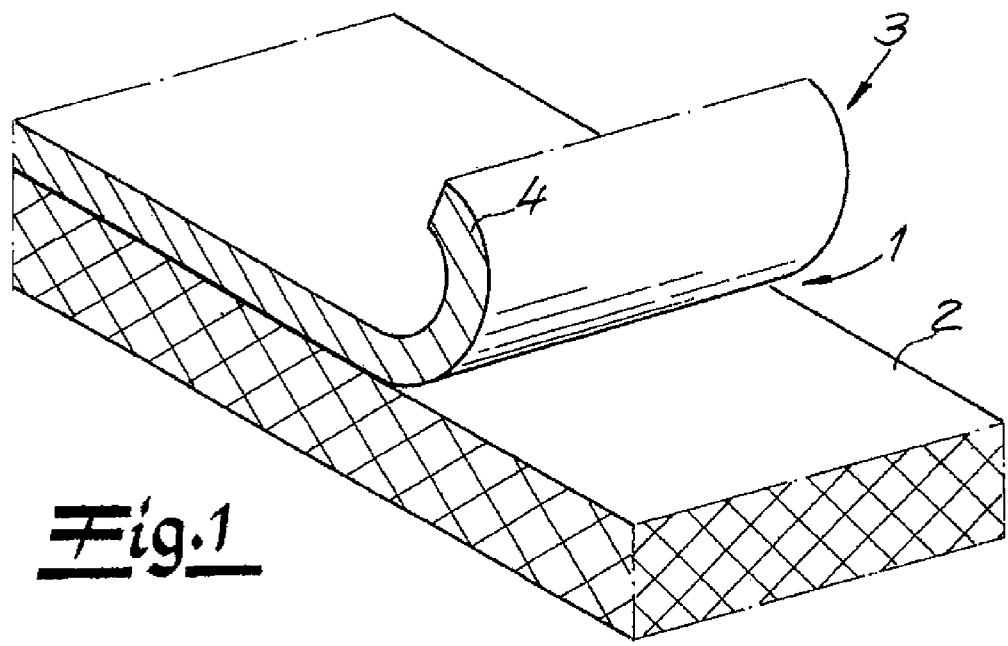
FIG. 1 is a large-scale view showing a first embodiment of the invention.

As seen in FIG. 1 a two-layer embodiment of a coextrusion film can be separated at an inner layer interface 1 into an elastic film 2 and a support film 3. The elastic film 2 consists of a single layer of a thermoplastic elastomer, for example a styrene block copolymer that has, because of its elastic properties, a high degree of adhesiveness. In order to make separation from the elastic film 2 possible, the support film 3 in the embodiment in FIG. 1 has a release layer 4 consisting of a inelastic polar polymer. In addition to making a separation possible, the release film 3 also serves to stabilize the elastic film 2, so that the entire coextrusion film can be handled easily without any significant expansion, even when exposed to increased tensions.

In order, for example, to form composite material elements for disposable hygiene articles, the elastic film 2 can be laminated with a nonwoven material after removing the support film 3.

Figure 2:
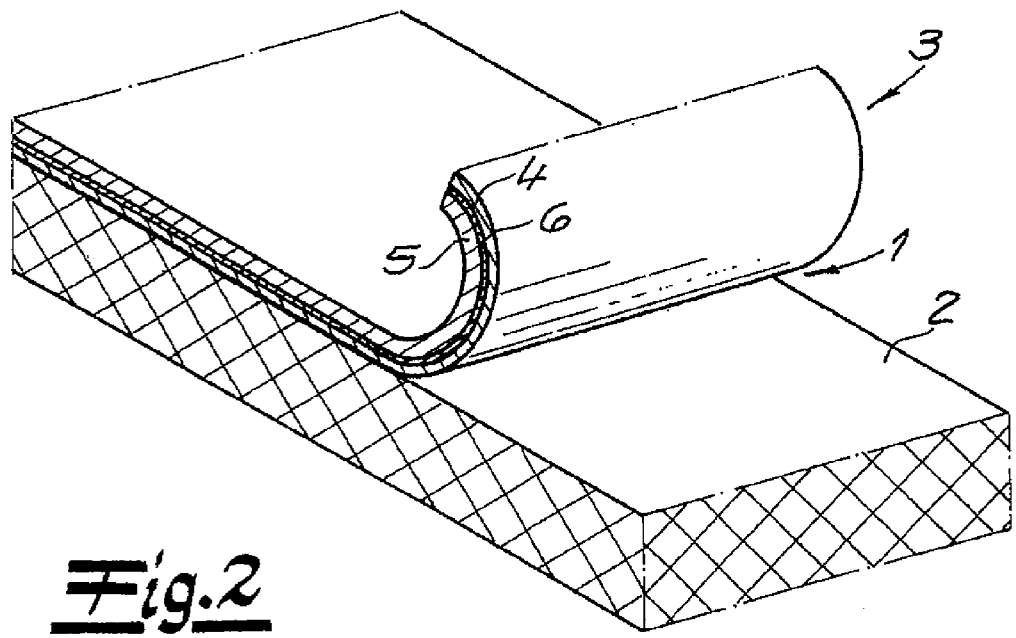
FIGS. 2-4 are views like FIG. 1 of second, third, and fourth embodiments of the invention.

In contrast to the embodiment according to FIG. 1, FIG. 2 shows a coextrusion film with a multilayer support film 3. The support film 3 has the release layer 4 lying directly against the elastic film 2, as well as a support layer 5 that is connected with the release layer 4 by an adhesive intermediate layer 6. The additional support layer 5 reenforces the support film 3, so that the release layer 4 can be made correspondingly thinner. This results in the advantage that the demand of is comparably expensive polar polymer for the release layer 4 is reduced.

Figure 3:
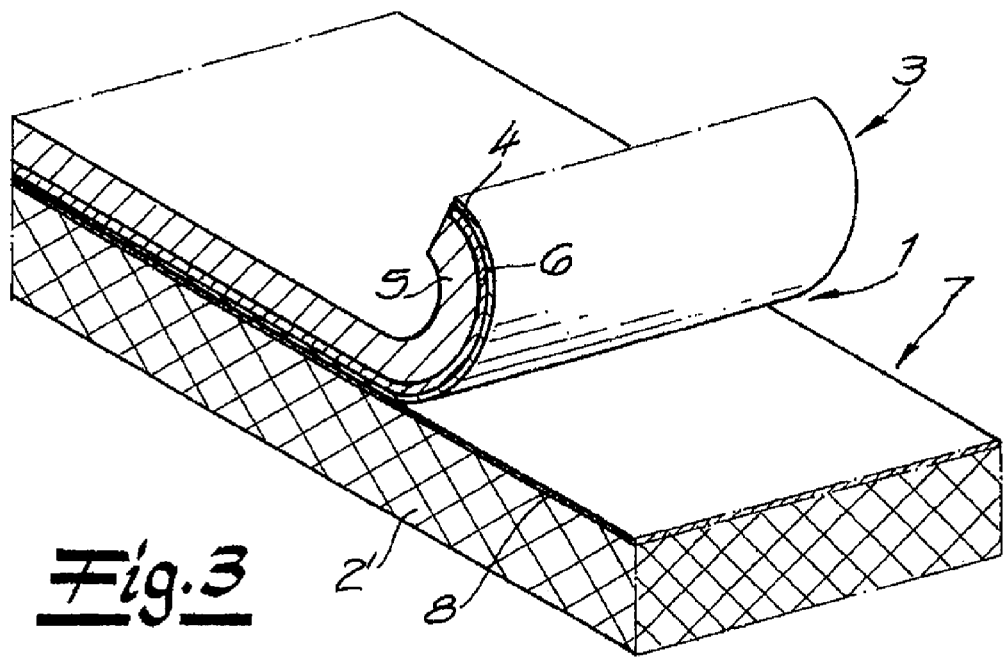
Figure 4:
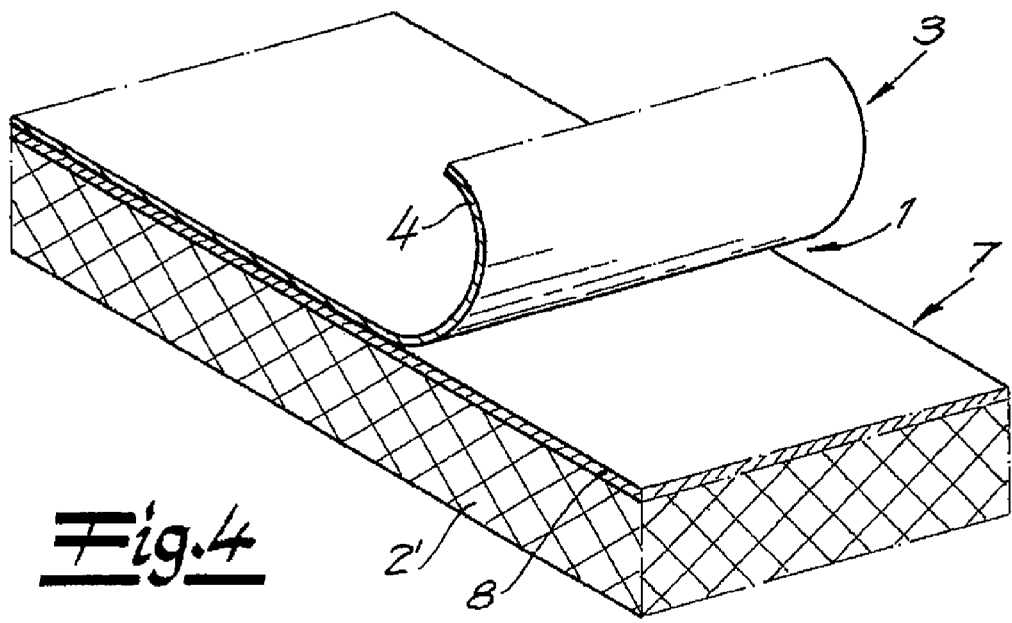

FIGS. 3 and 4 show additional embodiments of the invention, where the shown coextrusion film can be separated into a stretchable film 7 and the support film 3 at the inner layer interface 1. The stretchable film 7 has an elastic layer 2' made of thermoplastic elastomer, as well as a layer 8 of stretchable polymer. The support film 3 can, as described before, be designed as one or more layers. The additional layer 8 consisting of stretchable polymer is provided for imparting a certain stability to the elastic layer 2' after stripping of the support film 3. The stretchable film 7 that remains after separating the support film 3 needs to be, in spite of that, slightly stretchable in order to have good elasticity after being laminated with a nonwoven material to make an stretchable element for a hygiene article. The layer 8 consisting of stretchable polymer therefore usually has a thickness of less than 20 µm, preferably less than 10 µm.

FIG. 4 illustrates an embodiment with a two-layer stretchable film 7, as well as with a support film 3, that consists exclusively of the release layer 4.

Targeted tests have shown that the coextrusion films were produced with a layer structure according to FIGS. 1 to 4, where as elastic film 2 or elastic film 2', a 70 µm thick layer consisting of styrene block copolymer was always formed.

According to a first example, a sticky, elastic layer of styrene block copolymer together with a 30 µm thick layer of polyamide was coextruded as support layer 5.

According to a second example, a four-layer coextrusion film is made where the support film 3 has a 10 µm thick polyamide layer (PA) and a 15 µm thick support layer consisting of polyethylene of medium thickness (PE-MD), connected with the release layer 4 by a 5 µm thick layer of linear polyethylene modified with maleic acid anhydride having a low degree of thickness MEI modified PE-LLD) as adhesive intermediate layer 6.

In the embodiment of FIG. 3, a two-layer stretchable film was formed that has, in addition to the 70 µm thick elastic layer 2' consisting of styrene block copolymer, a 3 µm thick stretchable layer 8 of polyethylene of medium density (PE-MD). This release layer 4 of the three-layer support film 3 was formed out of polycarbonate (PC) with a thickness of 5 µm, the release layer 4 being connected by a 10 µm thick adhesive intermediate layer of MAH-modified PE LLD adjacent to a 28 µm thick support layer of PE-MD.

In the example according to FIG. 4, a two-layer stretchable film was coextruded with an elastic layer 2' and an additional 10 µm thick stretchable layer 8 of PE-MD together with a 5 µm thick support film of polycarbonate (PC)

Figure 5:
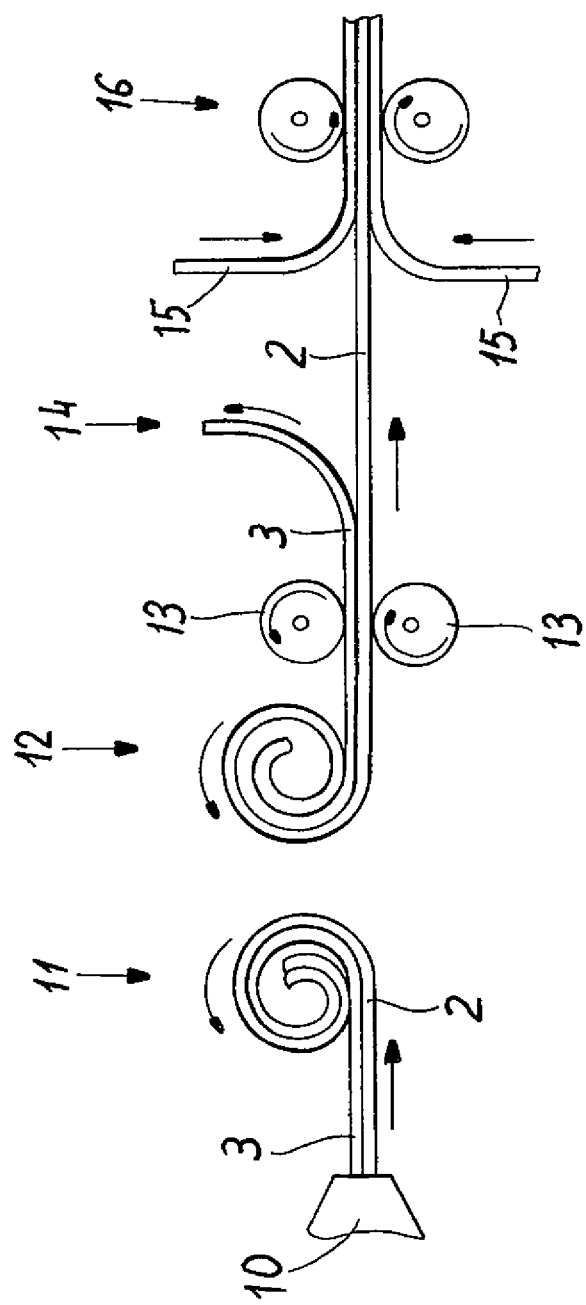
FIG. 5 is a diagrammatic view illustrating the method of this invention.

FIG. 5 shows a method of making a laminated web where at first a nozzle 10 extrudes a film having an elastic layer 2 of thermoplastic elastomer with an exposed outer face and an opposite inner face and a support layer 3 releasably bonded at an interface 1 to the inner face of the layer 3. The film 2, 3 is then rolled up as shown at 11 such that the support layer 3 prevents the elastic layer 2 in adjacent turns from touching each other. Subsequently the film 2, 3 is unrolled at 12. As this is done it is first cut into strips by cutter disks 13 and then at 14 the support layer 3 is removed. Finally a pair of relatively inelastic nonwoven webs are laminated to opposite faces of the elastic layer 2 at a laminating station 16.

All examples resulting from the experiments were able to be rolled up onto a roll after extrusion and stored without bonding together, the support film 3, after being rolled off from the elastic film 2, or the stretchable film 7, being easily separable.

I claim:

1. A coextrusion film comprising:
a monolithic elastic layer of a thermoplastic elastomer having an exposed outer face and an inner face;
a monolithic and inelastic support layer; and
a release coating of an inelastic polar polymer carried on the support layer, engaging, releasably joined to, and separable from the inner face.

2. The coextrusion film defined in claim 1, wherein the elastic layer is of styrene block copolymer.

3. The coextrusion film defined in claim 1, wherein the elastic layer and support layer are of different polarities at the inner face.

4. The coextrusion film defined in claim 1, wherein the release coating is of polyamide, polymethyl methacrylate, polyoxymethylene, polycarbonate, polyethylene terephthalate, and polybutylene terephthalate, or mixtures thereof.

5. The coextrusion film defined in claim 1, wherein the release coating includes a second support layer that forms a second exposed outer surface of the coextrusion film.

6. The coextrusion film defined in claim 5, wherein the second support layer is of polyolefin and is bonded by an adhesive layer to the release coating.

7. The coextrusion film defined in claim 1, wherein the release coating has a thickness of less than 20 µm.

8. The coextrusion film defined in claim 1, wherein the release coating has a thickness of less than 10 µm.

9. The coextrusion film defined in claim 1, wherein the composite adhesion is between 0.005 N/25 mm and 4 N/25 mm.

10. The coextrusion film defined in claim 1, wherein the composite adhesion is between 0.01 N/25 mm and 1 N/25 mm.

11. A coextrusion film comprising:
a stretchable layer having a thermoplastic elastomer sublayer and a stretchable polymer sublayer, the thermoplastic sublayer forming an exposed outer face and the stretchable polymer sublayer forming an inner face;
an inelastic and monolithic support layer; and
a release coating of an inelastic polar polymer carried on the support layer, engaging, releasably joined to, and separable from the inner face.

12. The coextrusion film defined in claim 11, wherein the stretchable polymer sublayer is in turn formed of two layers.

13. The coextrusion film defined in claim 11, wherein the elastic layer is of styrene block copolymer.

14. The coextrusion film defined in claim 11, wherein the stretchable sublayer has a thickness of less than 20 µm.

15. The coextrusion film defined in claim 11, wherein the stretchable sublayer has a thickness of less than 10 µm.

16. A method of making a laminated web, the method comprising the steps of sequentially:
a) coextruding a film having a monolithic elastic layer of thermoplastic elastomer with an exposed outer face and an opposite inner face and a monolithic and inelastic support layer releasably bonded at an interface to the inner face;
b) rolling up the film such that the support layer prevents the elastic layer in adjacent turns from touching each other;
c) unrolling the film; and
d) stripping the support layer from the elastic layer and laminating a nonwoven layer with the elastic layer.

17. The method defined in claim 16, further comprising the step after step a) and before step d) of
cutting the coextruded film into strips; and after stripping the support layer, laminating an inelastic nonwoven layer to both faces of the elastic layer.

* * * * *